Aug. 18, 1931.          H. LUNDQUIST          1,819,373
LIQUID LEVEL GAUGE
Filed Sept. 10, 1921      2 Sheets-Sheet 1
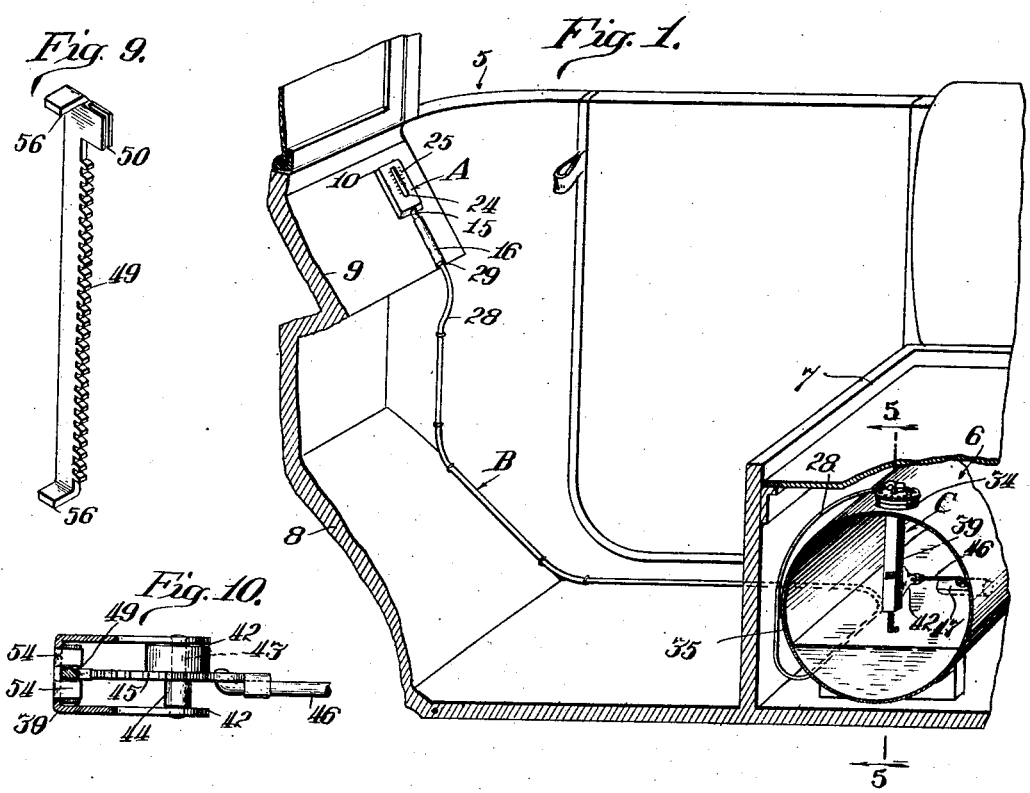
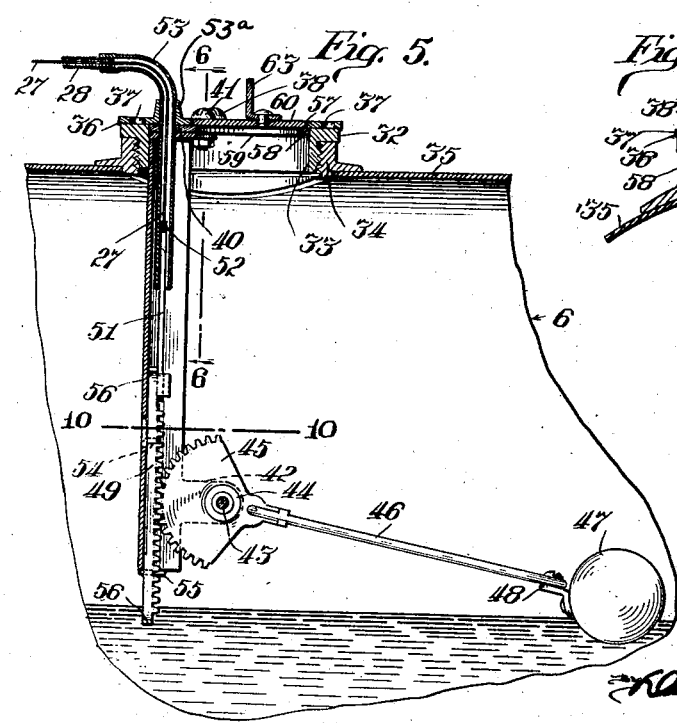
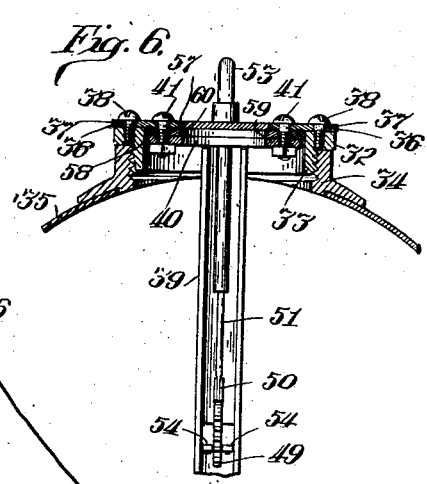
Inventor,
Hans Lundquist
Daniel F. Brennan.
Attorney

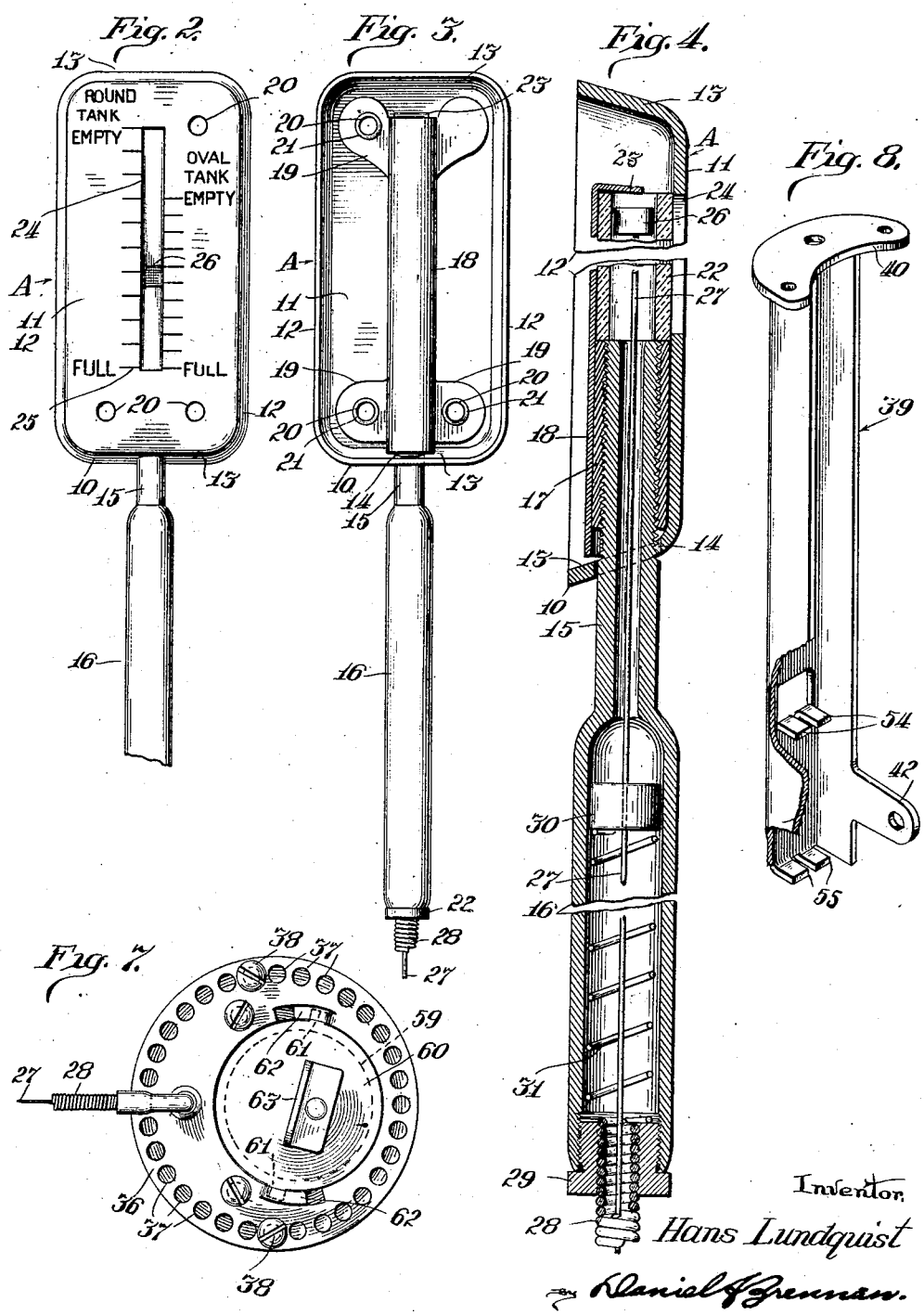

Patented Aug. 18, 1931

1,819,373

UNITED STATES PATENT OFFICE

HANS LUNDQUIST, OF CHICAGO, ILLINOIS, ASSIGNOR TO UNITED STATES SPECIALTY CORPORATION, A CORPORATION OF ILLINOIS

LIQUID LEVEL GAUGE

Application filed September 10, 1921. Serial No. 499,765.

This invention relates to new and useful improvements in liquid level gauges, and pertains more particularly to float operated gauges of this character.

While the principal aim of this invention is to generally improve upon and simplify the devices of the prior art, and to increase the efficiency of such devices, the present embodiment is as well designed as an improvement upon the device of my United States Letters Patent, No. 1,456,701, patented May 29, 1923, for fluid gauges, and more specifically aims to improve the motion transmitting means between the float and level indicator, and to improve the mounting of the float mechanism in a container.

While the improvements hereinafter described in detail are employed in a certain specific structural embodiment, it will be obvious that the functions and adaptations attributed to the various elements will be equally advantageous when adapted to other purposes or when incorporated in other mechanical organizations.

However, the invention finds its principal and most desirable employment in connection with automobiles and other similar vehicles for indicating the level of liquid fuel in the main and auxiliary supply tanks, so that the driver may at all times be apprised of the amount of fuel on hand.

An aim of the invention also is to provide a device of the character referred to which may be readily installed on any motor-vehicle without the aid of skilled help or the use of many tools.

In its broadest sense the invention resides in a gauge situated remote from the supply tank at some point convenient to the view of the operator, and including an indicator means operating relative to a calibrated scale, a float, and a flexible connection between the float and gauge, such as a cable.

Among the outstanding improvements of this invention is the novel means for maintaining the cable taut at all times; the novel float construction and associated mechanism; the improved detachable mounting of the float, and the flexible conduit construction for housing the cable.

Other aims of this invention, and the advantages thereof will appear in the following detail description and the claims, taken with an inspection of the accompanying drawings, in which:

Fig. 1 is a fragmentary perspective view of one installation of the liquid gauge of this invention, as applied to a motor-vehicle.

Fig. 2 is an enlarged fragmentary front elevation of the gauge or indicator.

Fig. 3 is a view on the same scale of the rear of the indicator.

Fig. 4 is a fragmentary further enlarged vertical sectional view of the gauge and parts immediately associated therewith.

Fig. 5 is a vertical sectional view of the tank and float mechanism taken on line 5—5 of Fig. 1, looking in direction indicated by the arrows.

Fig. 6 is a vertical section on line 6—6 of Fig. 5, looking in the direction indicated by the arrows.

Fig. 7 is a top plan of the closure for the tank.

Fig. 8 is a perspective view of the guide or column which supports the float and mechanism immediately associated therewith.

Fig. 9 is a similar view of the rack.

Fig. 10 is a transverse sectional view taken on line 10—10 of Fig. 5, looking in the direction indicated by the arrows.

Referring more particularly to the drawings, 5 is a portion of the body of a motor-vehicle employing an internal combustion engine, to which is supplied liquid fuel from a tank 6, located under the driver's seat 7, or at any other convenient point. The body has a foot board 8 and dash 9, upon which is mounted the improved indicating device of my invention, generally designated A, and connected by a flexible motion transmitting element B to float mechanism C located in the tank 6. Of course, the general arrangement as outlined may be varied to suit the conditions met in service.

The indicator or gauge A preferably comprises a housing 10 open at the rear and composed of a stamping including a front wall 11 and side and end walls 12 and 13, respectively. One of the end walls is provided with an aperture 14 to permit the entrance of a sleeve 15 which forms the reduced extension of the casing 16, said sleeve being externally threaded for engagement with an internally threaded bushing 17, which latter is fixedly retained in the housing 10 by the engagement therewith of the lower end and of semi-circular shield 18, said shield being provided with laterally disposed apertured ears 19, through which ears, and openings 20 in the front wall of the shield, are disposed eye rivets 21, thus fixedly securing the shield and bushing within the housing. Securing means, such as screws, may pass through the eye rivets into the dash for mounting the housing.

A relatively heavy transparent tube 22 abuts at one end upon the upper end of the bushing 17, and the shield is provided with a forwardly bent lug 23 which lies upon the other end of said tube and thus serves to maintain the same against displacement, the shield partially embracing said tube. By relative rotation of the sleeve 15 and housing 10 the sleeve may be adjusted longitudinally with respect to the indicator housing 10 and transparent tube 22, movement of the latter being prevented, as herein pointed out, by abutment with the bushing 17. This serves as an auxiliary adjustment for calibrating the instrument when installing. A longitudinal slot, 24 is provided in the front wall 11, of less width than the diameter of the tube, but of a length substantially coincident with the length of the tube, whereby the tube is partially exposed to view through the slot. Indicia 25 are placed on the exposed face of the front wall adjacent the edges of the slot, and words stamped in the front wall indicate the condition of the fuel level in the tank, are associated therewith. The indicia, and arrangement of the words may be varied to suit different conditions and requirements in service. As shown, they are arranged for use where a fuel tank having two compartments, namely, a main and an auxiliary compartment is employed.

A movable indicating element cooperates with the indicia, and preferably comprises an enlarged head 26, fitting loosely in the tube 22 and longitudinally movable therein, this head being fixedly connected to one end of a motion transmitting element in the form of a flexible wire, strand or cable 27, which latter passes through the extension 15, casing 16, and a flexible conduit 28 to the float mechanism C.

The conduit 28 preferably is composed of a helically tightly wound flexible and resilient strand of wire, and is intended to fairly snugly embrace the wire strand or cable 27, one end of said conduit being fixed to a threaded plug 29 which is threaded into the free open end of the casing 16. The nature of the conduit 28 is such that if it requires extension while being installed this can be accomplished within reasonable degree, this contributing toward the convenient adjustment of the parts when affixing the conduit as shown in Figure 1. This does not destroy the setting as it may be done only when installing, and will remain substantially fixed thereafter.

In order to prevent buckling of the cable 27 and to maintain the same taut at all times, especially where the same, when installed, must go around a number of corners, a plunger or block 30 is fixedly connected to that portion of the cable 27 lying within the casing 16, and a relatively light helical expansion spring 31 is interposed between the plunger 30 and the inner face of the plug 29. The plug is threaded so as to permit adjustment of the tension of the spring 31 on said cable. This spring acts against the rising of the float and also serves to return the head 26 to normal position, which in the present instance indicates the tank as empty. This arrangement might be reversed, but has the additional feature of surety in operation in so far as the indicating of liquid level conditions is concerned, and also in that should the cable 27 break, the indicator will immediately move to "empty" position, thus apprising the driver that there is something wrong.

As previously explained the motion transmitting cable is extended to the float mechanism C in the tank 6, the float mechanism taking a form to be presently described. As pointed out hereinbefore it is desirable that the device be in the nature of a unit mechanism, so that the article may be sold in its entirety and thus ready for installation on the vehicle.

With this end in view, there is provided a ring 32 which is provided with an externally threaded extension 33, of a size and gauge adapted to fit the standard internally threaded collar 34, usually placed in the cylindrical wall 35 of the tank 6, to afford an inlet through which the tank may be filled. The ring 32 receives upon its upper surface a circular metallic disc 36, provided near its periphery, with a circumferential series of openings 37, through two or more of which openings two or more securing machine screws 38 may pass, said screws engaging in complementally disposed threaded openings in the ring 32, preferably substantially diametrically oppositely located.

A vertical supporting column or guide 39 is fixedly secured to the under surface of the disc 36 by means of a lateral portion 40, through which lateral portion and the disc are disposed bolts 41 for insuring rigidity of the column 39. As best shown in Fig. 8 the column is U-shaped in cross-section and is provided with integral parallel lugs 42—42 near the lower end thereof and extending from the sides of the column, said lugs being complementally apertured to afford bearings for a transverse shaft 43, upon which is rotatably mounted a bearing sleeve 44 carrying a segmental gear 45. This sleeve serves to steady the gear and prevent sidewise movement of the same on said shaft.

A rod 46 extends from a lug formed on the axis of the gear at the rear thereof and radially of the shaft, a float 47, in the form of a cylinder, being secured by a bracket 48 to the free end of said rod.

A rack bar 49 is arranged for vertical longitudinal movement in the guide 39 and is provided at the upper end with a slot 50 to receive the link 51, which latter is soldered or otherwise connected at 52 to the tank end of the cable 27, which cable is introduced into the tank through a rigid right-angular pipe 53, which latter forms a continuation of and is connected to the flexible conduit 28 either by internal threads to receive the latter or by soldering, one leg of said pipe passing through a bushing 53ª in the disc 36 and fixedly secured thereto, and disposed within the guide 39. This leg of the pipe receives the link 51 when the latter is in raised position.

The rack moves between a pair of spaced lugs 54 struck from the rear wall of the column 39, and between a complementally alined pair of lugs 55 bent inwardly at the lower end of the column, said rack having laterally bent portions 56 at its ends which serves as limit stops by engaging said pairs of lugs at each end of the rack stroke, thus preventing complete disengagement of the rack from the guides. The gear 45 being in engagement with the rack prevents outward movement of the rack relative to the column.

In order to permit of access to the interior of the tank 6 for filling or other reasons, there is provided an eccentric opening 57 in the disc 36, and an annulus 58 is placed on the under surface of the discs 36, with an eccentric opening of less diameter than that of the opening 57 to afford a supporting flange 59 adapted to receive a closure plate 60, which latter is provided with radial lugs 61 adapted to engage beneath complementally formed tongues 62 provided diametrically opposite on the periphery of the opening 57.

A finger piece 63 is secured to the closure 60 to facilitate application and removal of the same, this being accomplished much in the manner of the conventional bayonet slot connection. The annulus 58 is provided with an outer periphery concentric with that of the disc 36 and adapted to fit snugly in the ring 32, so as to facilitate the circumferential adjustment of the disc on said ring.

If desired, the conduit 28 may be secured to the flooring of the vehicle by staples as shown in Fig. 1 and is of such flexibility that its installation is simple and may be accomplished by one other than a mechanic. Furthermore, the conduit may be provided with a fabric covering to prevent injury thereto, where exposed.

When the device is mounted as shown in Fig. 1 and the conduit is properly covered as referred to, the connection between the tank and the indicator is a substantially airtight one so that fumes from the tank cannot escape from the indicator and thus render the apparatus dangerous. It will be observed, that adjustment of the length of the communicating means between the tank and the indicator may be accomplished by rotation of the member 29 in the member 16 or by rotation of the member 15 with its threaded portion in the indicator housing. This rotation of these elements will move the indicator along the lengths of the members 15 and 16 and thus afford an adjustment so that when installing and subsequently thereto, if desired, the indicator may be rendered accurate.

The operation of the device is obvious, it being observed that as the tank is filled the float rises and imparts downward movement to the cable 27 against the tension of the spring 31, through the motion of the gear 45 imparted to the rack 49, thus lowering the indicating head 26 in the tube 22. Upon the position of the head relative to the indicia depends the indication of level shown. It will be observed that the device when ready for use, may be readily installed without any adjustment whatsoever. The spring 31 insures the device being of a "normally danger" nature, and the provision of the flexible and resilient conduit insures an even distribution of tension on the cable throughout.

While a specific embodiment of the invention involving certain details of construction has been disclosed and described, it is of course obvious that minor changes within the purview of the invention are permissible, within the scope of the claims.

I claim:

1. In a device of the character described, in combination, a transparent tube, a casing which is in axial alinement with said transparent tube, means for relatively longitudinally adjusting the tube and casing, a flexible cable extending through said tube and casing, actuating mechanism connected to said cable, a resiliently extensible housing surrounding said cable and adjustably connected to said casing, and means in said casing for maintaining said cable under tension.

2. In a liquid level gauge, a float mechanism, an indicator comprising a transparent tube, a casing connected to and in axial alinement with said tube, a flexible resilient conduit connected to said casing, a level indicating member movable in said tube, a cable extending through said conduit and connecting said indicating member with said float mechanism, adjustably yieldingly resistant means in said casing for maintaining said cable taut, and normally tending to return the indicator to a position indicating low level.

3. In a liquid level gauge, a float mechanism, a transparent tube, an indicator, movable in said tube, a casing, means for connecting same to and in axial alinement with said tube, a flexible resilient conduit, a cable extending through said casing and conduit and connecting said float mechanism and indicator, a plunger in said casing and fixedly connected to said cable, and a compressible helical spring also in said casing and engaged with said plunger for maintaining the cable under tension.

4. The combination with a tank having an opening and a liquid level indicator for the contents of said tank, of a removable closure for said opening comprising a threaded ring engaging in the opening, a plate carried by said ring and circumferentially adjustable thereon, means attached to said plate and extending into the ring for centrally aligning said plate on said ring, a section of said plate being removable independently, a guide detachably mounted upon said plate and extending therefrom into the tank, a rack in said guide operatively connected with said indicator, and a float also carried by the guide and means for connecting said float to said rack.

5. In combination, an actuator and an indicator the latter having an adjustably mounted elongated sleeve thereon, a yielding flexible connecting means between said indicator and actuator including a single flexible member and a flexible casing therefor, the first mentioned member being adapted to pass freely within said casing, and means adjustably mounted in said sleeve and engaging said flexible member for maintaining the same taut.

6. In combination a fuel level indicating device including a housing, an actuator, a communicating means between said actuator and indicator for connecting the same including a flexible cable which extends into said housing and provided with a head, a casing having one end extending into said housing and through which said cable passes, a plunger on said cable within said casing, a resilient member in said casing abutting the other end of said casing and acting upon said plunger, protecting means for the cable, and adjustable means for connecting said protecting means to said casing to permit of varying the distance between the actuator and indicator housing.

7. In combination a fuel level indicating device including a housing, an actuator, a communicating means between said actuator and indicator for connecting the same including a flexible cable which extends into said housing and provided with a head, a casing forming an extension of said indicator housing and through which said cable passes, a plunger fixed on said cable within said casing, a resilient member in said casing abutting one end of said casing and acting upon said plunger, protecting means for the cable, and adjustable means for connecting said protecting means to said casing to permit of varying the distance between the actuator and indicator housing.

8. In combination a fuel level indicating device including a housing, an actuator, a communicating means between said actuator and indicator for connecting the same including a flexible cable, which extends into said housing and provided with a head, a casing in threaded adjustment with and forming an extension of said indicator housing and through which said cable passes, a plunger fixed on said casing, a resilient member in said casing abutting one end of said casing and acting upon said plunger, protecting means for the cable, and adjustable means for connecting said protecting means to said casing to permit of varying the distance between the actuator and indicator housing.

9. In combination a fuel level indicating device, including a housing, an actuator, a communicating means between said actuator and indicator for connecting the same including a flexible cable which extends into said housing and provided with a head, means for maintaining said cable taut including a casing through which said cable passes, a plunger fixed on said cable within the casing, and a resilient member in said casing for acting upon said plunger, protecting means for the cable, and adjustable means for connecting said protecting means to said casing to permit of varying the distance between the actuator and indicator housing, said resilient member abutting at one end said adjustable means for connecting the protecting means.

10. In a liquid level gauge, the combination with a tank having a filling opening, of a readily removable closure for said opening, an indicator mounted remote from said tank, a liquid level responsive mechanism, means for directly adjustably and detachably mounting said mechanism on a part of said closure and disposed within the filling opening of the tank, a flexible cable connecting said mechanism to said indicator, means for maintaining said cable taut, and means for adjusting the tension of said last mentioned means.

11. In a device of the character described, in combination, a transparent tube, a casing which is in axial alignment with said tube, means for relatively longitudinally adjusting said transparent tube and casing, a flexible cable extending through said tube and casing, a means in said casing for maintaining said cable under tension, means for adjusting the connection of said tension maintaining means with said casing.

12. In a liquid level gauge, the combination with a tank adapted to contain liquid, an indicator placed at a point removed from said tank, said tank having an opening, a closure for said opening comprising, a ring engaging in said opening, and a plate adjustably mounted on said ring, means cooperating with said plate and said ring for securing the plate in adjusted position, a guide detachably mounted upon said plate and extending therefrom into the tank, a rack movable in said guide, a float for actuating said rack, and means connecting said rack and indicator.

In testimony whereof, I affix my signature at 36 W. Randolph St., Chicago, Illinois.

HANS LUNDQUIST.